United States Patent [19]

Calabro et al.

[11] Patent Number: 5,102,955
[45] Date of Patent: Apr. 7, 1992

[54] BROAD DISTRIBUTION, HIGH MOLECULAR WEIGHT LOW DENSITY POLYETHYLENE AND METHOD OF MAKING THEREOF

[75] Inventors: David C. Calabro, Somerset; Pamela J. Cook, Jamesburg, both of N.J.; Bohumil V. Kral, Victoria, Australia

[73] Assignee: Mobil Oil Corporation, Fairfax, Va.

[21] Appl. No.: 458,855

[22] Filed: Dec. 29, 1989

[51] Int. Cl.$^5$ .................. C08L 23/04; C08L 23/18; C08L 23/06
[52] U.S. Cl. .................................... 525/240; 525/324
[58] Field of Search ........................................ 525/240

[56] References Cited

U.S. PATENT DOCUMENTS

| | | | |
|---|---|---|---|
| 4,230,831 | 10/1980 | Sakurai et al. | 525/240 |
| 4,338,424 | 7/1982 | Morita et al. | 526/65 |
| 4,339,507 | 7/1982 | Kurtz et al. | 525/240 |
| 4,429,079 | 1/1984 | Shibata et al. | 525/240 |
| 4,438,238 | 3/1984 | Fukushima et al. | 525/240 |
| 4,705,829 | 11/1987 | Kwack et al. | 525/240 |
| 4,814,135 | 3/1989 | Heitz | 525/240 |
| 4,824,912 | 4/1989 | Su | 525/240 |
| 4,828,906 | 5/1989 | Nishimura et al. | 525/240 |
| 4,835,219 | 5/1989 | Tajima et al. | 525/240 |
| 4,842,922 | 6/1989 | Krupp et al. | 525/240 |

FOREIGN PATENT DOCUMENTS 0100843 2/1984 European Pat. Off.
57-59943 4/1982 Japan.

Primary Examiner—Carman J. Seccuro
Attorney, Agent, or Firm—Alexander J. McKillop; Charles J. Speciale

[57] ABSTRACT

There is disclosed a low density polymer having a broad molecular weight distribution, such that its melt flow ratio (MFR) is about 50 to about 250, and a substantially constant melt index-corrected density. The polymer, produced e.g., by blending a first polymer component of high molecular weight with a second polymer component of low molecular weight, with both polymer components having substantially the same melt index-corrected density, produces films having improved strength properties and low hexane extractables, as compared to films made from comparable individual polymer components.

There is also disclosed a low density polymer, also having MFR of about 50 to about 250, having substantially no polymer chains having low molecular weight and short chain branches, which is prepared by blending a first polymer component of low density and high molecular weight with a second polymer component of relatively high density and relatively low molecular weight. The melt index-corrected densities of these two polymer components are dissimilar.

9 Claims, No Drawings

BROAD DISTRIBUTION, HIGH MOLECULAR WEIGHT LOW DENSITY POLYETHYLENE AND METHOD OF MAKING THEREOF

BACKGROUND OF THE INVENTION

1. Field of the Invention

This invention is directed to a low density polyethylene having broad molecular weight distribution and substantially uniform branching frequency, and to a method of preparation thereof. More particularly, the invention is directed to a low density polymer having a broad molecular weight distribution and excellent strength properties, but relatively low level of hexane extractables.

2. Description of Related Art

High density polyethylene (HDPE) polymers having broad molecular weight distribution and high molecular weight have been proposed in the past. Such polymers are usually made by blending high molecular weight, high density component with a low molecular weight, high density component. The high molecular weight component has low melt index (e.g., $I_{21}$ of about 0.1 to 1.0 g/10 min), while the low molecular weight component has a high melt index (e.g., $I_2$ of at least about 100 g/10 min). Both the low molecular weight and the high molecular weight components have substantially the same densities of at least about 0.940 g/cc, indicating that the melt index-corrected density, and therefore the branching frequency, of the two component resins differ greatly from each other.

These blends have good physical properties, derived from the high molecular weight component, and good processability, provided by the low molecular weight component. However, such a method of producing the blends is restricted to high density polymers because it is believed in the art that if low density, broad molecular weight distribution polymers were made by blending a high molecular weight, low density component with a low molecular weight, low density component, the resulting blend would produce end use products, such as films, having high hexane extractables. As is known to those skilled in the art, high hexane extractables are undesirable because films and other articles made from such polymers may not meet strict Food and Drug Administration (FDA) requirements which limit the amount of hexane extractables. Additionally, high levels of hexane extractables may cause operational difficulties, e.g., in extruders the extractable material tends to separate out in the die and drip therefrom.

It is also known that low density and medium density copolymers of ethylene with higher alpha-olefins, such as 1-hexene or 1-octene, have good strength properties, e.g., good tear strength resistance. However, such polymers have relatively narrow molecular weight distribution which is undesirable in some applications, e.g., wherein broad molecular weight distribution is needed to exploit the benefits of the high molecular weight fraction, such as increased film strength.

Polymers having multi-modal molecular weight distribution are also known in the art. Multi-modal molecular weight distribution means that the molecular weight distribution of the polymer is relatively broad and two or more peaks of different molecular weights are readily discernible in a plot of molecular weight as a function of relative proportions of the polymer having the given molecular weight, such as that obtained by gel phase chromotography (GPC) analysis of the polymer, e.g., see Morita et al, U.S. Pat. No. 4,338,424.

Bailey et al, European Published Patent Application 0 100 843, published on Feb. 2, 1984 disclose blends of two high density polymers: a high molecular weight polymer and a low molecular weight polymer, both preferably having narrow molecular weight distribution and low levels of long chain branching. The blends produce films having good properties and environmental stress crack behavior.

It is the primary object of the present invention to provide a low density polymer, particularly linear low density polyethylene (LLDPE), having relatively broad molecular weight distribution, and therefore good processibility at high molecular weights. This combination of low density and broad molecular weight distribution provides exceptional impact strength, tear resistance, and relatively low levels of hexane extractables.

Other objects of the invention will become apparent to those skilled in the art from the following description thereof.

SUMMARY OF THE INVENTION

A low density polymer, particularly a linear low density polymer (LLDPE), which has a broad molecular weight distribution, such that its melt flow ratio (MFR) ranges from about 50 to about 250, and a substantially constant melt index-corrected density throughout the molecular weight distribution of the polymer is disclosed. Films manufactured from the polymer have excellent strength properties and relatively low hexane extractables.

A method of making the aforementioned polymer comprises blending a first polymer component of high molecular weight with a second polymer component of low molecular weight, the first and the second polymer components having substantially the same melt index-corrected density. Since both the first and the second polymer components have substantially the same melt index-corrected density, the branching frequency of both polymers is believed to be substantially constant.

An alternative method of making the aforementioned polymer comprises polymerizing an olefin or a mixture of olefins in the presence of a catalyst composition to a second polymer component having low molecular weight, and subsequently polymerizing an olefin or a mixture of olefins in the presence of the same or different catalyst composition to a first polymer component having high molecular weight, with both the first and the second polymer components having substantially the same melt index-corrected density, to obtain the low density polymer of this invention. The product has a substantially constant branching frequency throughout the molecular weight distribution of the polymer.

In a second embodiment a low density polymer, particularly an LLPDE, also having a broad molecular weight distribution, is prepared by a method comprising blending a first polymer component, which is preferably LLDPE, having density of about 0.880 to about 0.930 g/cc, and high molecular weight, so that its high load melt index ($I_{21}$) is about 0.1 to about 3.0 g/min, with a second polymer component having density of about 0.940 to about 0.970 g/cc, and relatively low molecular weight, so that its melt index ($I_2$) is about 100 to about 1000 g/10 min. This alternative polymer also produces films having excellent strength properties and relatively low hexane extractables.

DETAILED DESCRIPTION OF THE INVENTION

The polymers of all embodiments of this invention have broad molecular weight distribution, as evidenced by the melt flow ratio (MFR) thereof in the range of about 50 to about 250, preferably about 70 to about 200 and most preferably about 80 to about 160.

The invention will be described hereinafter in terms of the two embodiments thereof summarized above. However, as will be apparent to those skilled in the art, the invention is not limited to these two embodiments, but rather encompasses all embodiments covered by this description of the invention.

First Embodiment (Polymer Made From Two Components of Substantially The Same Melt Index-Corrected Density)

The polymer of the first embodiment of the invention has a substantially constant melt index-corrected density throughout the molecular weight distribution of the polymer. The term "substantially constant melt index-corrected density throughout the molecular weight distribution of the polymer" means that the number of short chain branches is substantially constant throughout the polymer. The high molecular weight component and the low molecular weight component have substantially the same frequency of branches, i.e., the number of branches per 1000 carbon atoms of the backbone chains of both components is substantially the same. Measured density is dependent on molecular weight, so by "correcting" the density, of both components to melt index $(I_2) = 1.0$, the molecular-weight dependence is eliminated and the corrected density is only a function of branch content. Generally, the melt index-corrected density is the density that would be obtained if the melt index $(I_2)$ of both components was 1.0.

Substantially constant melt index-corrected density is obtained by choosing components that have the desired melt index and measured densities that will result in a constant melt index-corrected density. The constant melt index-corrected density, i.e., the density normalized to melt index $(I_2) = 1.0$, is calculated from the following equation:

$$d_c = d - 0.0105[1 - (I_2)^{-0.28}]$$

where
$d_c$ is melt index - corrected density;
d is measured density;
$I_2$ is melt index.

For example, if the first polymer component has a high load melt index $(I_{21})$ of 0.4, and the second polymer component has a melt index $(I_2)$ of about 100, to obtain a polymer product having melt index-corrected density of 0.932 g/cc, the measured densities of the first and second polymer components would have to be 0.904 and 0.937 g/cc, respectively. The melt index-corrected density of the first and second polymer components would be 0.932 g/cc. If the proportions of the first polymer component and the second component were such that the final blend high load melt index $(I_{21})$ was 7.0, then the measured density of the final polymer product would be 0.918 g/cc. Thus, the polymer of this embodiment has measured density of about 0.900 to about 0.940, preferably about 0.915 to about 0.930, and most preferably about 0.918 to about 0.925 g/cc, and high load melt index $I_{21}$) of about 3.0 to about 25.0, preferably about 5.0 to about 15.0, and most preferably about 6.0 to about 10.0 g/10 min. Since the melt index-corrected density of the polymer is substantially constant throughout its molecular weight distribution, it indicates that the branching frequency of the polymer is also substantially constant, as will be apparent to those skilled in the art. Without wishing to be bound by any theory of operability, it is believed that the constant branching frequency imparts outstanding strength characteristics to the polymer of this embodiment of the invention.

The polymer of this embodiment can be produced by any suitable means, e.g., by blending together two separate polymer components, the first polymer component having a high molecular weight and the second polymer component having a low molecular weight, providing that both, the first and the second polymer components have substantially the same melt index-corrected density. The molecular weight of the first polymer component is relatively high, as reflected by the high load melt index $(I_{21})$ thereof of about 0.1 to about 3.0, preferably about 0.1 to about 1.0, most preferably about 0.2 to about 1.0 g/cc. The measured density of the first polymer component is about 0.880 to about 0.930, preferably about 0.890 to about 0.920, and most preferably about 0.900 to about 0.915 g/cc. The molecular weight of the second polymer component is relatively low, as reflected by the melt index $(I_2)$ thereof of about 100 to about 1,000, preferably about 100 to about 700 and most preferably about 200 to about 500 g/10 min. The measured density of the second polymer component is about 0.900 to about 0.950, preferably about 0.920 to about 0.945, and most preferably about 0.920 to about 0.935 g/cc. Since the final polymer product of this embodiment has measured density of about 0.900 to about 0.940, preferably about 0.915 to about 0.930, and most preferably about 0.918 to about 0.925 g/cc, the melt index-corrected density of the first polymer component and the second polymer component and, therefore, the polymer product of this embodiment is about 0.890 to about 0.940, preferably about 0.910 to about 0.940 and most preferably about 0.915 to about 0.930 g/cc. The blending is carried out in a conventional manner, e.g., by initially dry blending the resin in a mixer with suitable additives, and then melt blending it in an extruder. The relative proportions of the first and second polymer components are such that the blending produces the polymer product having the aforementioned properties, e.g., MFR, density and $I_{21}$.

Alternatively, the polymer of this embodiment can also be produced by sequentially polymerizing the two polymer components in the presence of the same or different olefin polymerization catalyst, such as any Ziegler-Natta catalyst which produces polymers of narrow molecular weight distribution. For example, initially the second polymer component, defined above, of low molecular weight is produced in the presence of an olefin polymerization catalyst and with a substantial amount of added hydrogen in the polymerization reactor. Subsequently, the first polymer component, also defined above, having high molecular weight is polymerized in the same reactor as the second polymer component or in a separate reactor in the presence of a catalyst and reactor conditions (such as the amount of hydrogen) which are the same as or different than the catalyst and the reactor conditions used to polymerize the second polymer component. The relative amounts of the first and second polymer components produced in this alternative method are such that the polymer product has the aforementioned properties, e.g., MFR, density and $I_{21}$. This alternative method of producing the polymer of this invention is therefore similar to the processes known as tandem reactor processes previously used for the production of polymers different than those of this invention, e.g., see Morita et al, U.S. Pat. No. 4,338,424.

The branching frequency of the first and second polymer components and of the polymer is defined by the melt index-corrected density.

Therefore, in accordance with this embodiment of the invention, there is produced a polymer having substantially constant melt index-corrected density of substantially all of its components throughout the molecular weight distribution of the polymer. Films made from the polymer of this embodiment exhibit synergistically better strength properties, such as tear resistance properties, than films made from single-component resins of somewhat higher density and similar or substantially higher flow index ($I_{21}$) These results contradict the prior art which taught that when it was desired to obtain high density, high molecular weight resins ($I_{21}$ of about 3.0 to about 15.0) by blending two separate polymer components, it was necessary to use the components having the same or similar densities. These results also contradict prior art which taught that it was not possible to produce useful low density high molecular weight polymers, because such polymers, according to prior art, would have such high extractables levels which would render the polymers unsuitable for extrusion. It is therefore surprising and unexpected that the low density components having dissimilar densities, but substantially the same melt index-corrected densities, produce a polymer product which, when manufactured into a film, has superior strength properties as compared to the strength properties of film made from the individual polymer components.

Second Embodiment (Polymer Made From Two Components of Dissimilar Melt-Index Corrected Density)

The relatively broad molecular weight distribution polymer of this embodiment, having the same MFR as the polymer of the first embodiment, has measured density of about 0.910 to about 0.940, preferably about 0.915 to about 0.940, and most preferably about 0.920 to about 0.940 g/cc, and high load melt index ($I_{21}$) of about 3.0 to about 25.0, preferably about 5.0 to about 15, and most preferably about 6.0 to about 10.0 g/10 min. This polymer is made by blending a first polymer component having relatively high molecular weight and relatively low density with a second polymer component having relatively low molecular weight and relatively high density. The first polymer component has high load melt index ($I_{21}$) of about 0.1 to about 3.0, preferably about 0.1 to about 1.0, and most preferably about 0.2 to about 1.0 g/10 min, and density of about 0.880 to about 0.930, preferably about 0.890 to about to about 0.920, and most preferably about 0.900 to about 0.915 g/cc. The melt index-corrected density of the first polymer component is about 0.890 to about 0.940, preferably about 0.910 to about 0.940, and most preferably about 0.915 to about 0.930 g/cc. The second polymer component has melt index ($I_2$) of about 100 to about 1,000, preferably about 100 to about 700, and most preferably about 200 to about 500 g/10 min, and density of about 0.940 to about 0.970, preferably about 0.950 to about 0.970, and most preferably about 0.960 to about 0.970 g/cc. The melt index-corrected density of the second polymer component is about 0.930 to about 0.970, preferably about 0.940 to about 0.970, and most preferably about 0.950 to about 0.970 g/cc. The relative proportions of the first and second polymer components are such as to produce the final polymer product having the aforementioned properties, e.g., density, MFR and $I_{21}$. The polymer product of this embodiment also produces films having excellent strength properties, as compared to the films made from single component resins of similar density and melt index.

Additionally, the polymer product of this embodiment has relatively low levels of extractables. The chemical nature of the extractables is also changed, as compared to the extractables present in a single component resin, such as Exxon 44.87 resin, described in Table 1, below. In particular, the extractable material of this polymer product has weight average molecular weight about an order of magnitude higher than the polymer of the single component resin, and it contains substantially no polymer chains having both, low molecular weight (about 1,000 to about 10,000) and a significant number of short chain branches, i.e., chain branches of either 2 or 4 carbons in length, usually introduced into the polymer by a copolymer, e.g., 1-butene or 1-hexene.

Without wishing to be bound by any theory of operability, it is believed that the level of extractables decreased in the polymer product of this embodiment because the second polymer component of relatively low molecular weight and relatively high density contains substantially no branches, while the first polymer component of relatively high molecular weight and relatively low density has a substantial number of branches. It is believed that concentrating the branches on the relatively high molecular weight component skewes the branching distribution toward the high molecular weight of the blend and reduces the extractables content of the final polymer product.

It will be apparent to those skilled in the art that conventional additives, such as antioxidants, can be used in the preparation of the polymers of all embodiments of this invention.

The following Examples further illustrate some features of the invention. However, it will be apparent to those skilled in the art that the specific reactants and reaction conditions used in the Examples do not limit the scope of the invention.

The properties of the polymers produced in the Examples and any calculated process parameters were determined by the following test methods:

Density: ASTM D 1505—A plaque is made and conditioned for one hour at 100° C. to approach equilibrium crystallinity. Measurement for density is then made in a density gradient column; reported as gms/cc.

Melt Index (MI), $I_2$:ASTM D-1238—Condition E—Measured at 190° C.—reported as grams per 10 minutes.

High Load Melt Index (HLMI), $I_{21}$:ASTM D-1238—Condition F—Measured at 10.5 times the weight used in the melt index test above.

Melt Flow Ratio (MFR)=$I_{21}/I_2$.

N-hexane extractables (FDA test used for polyethylene film intended for food contact applications): A 200 square inch sample of 1.5 mil gauge film is cut into strips measuring 1"×6" and weighed to the nearest 0.1 mg. The strips are placed in a vessel and extracted with 300 ml of n-hexane at 50°±1° C. for 2 hours. The extract is then decanted into tared culture dishes. After drying the extract in a vacuum desiccator, the culture dish is weighed to the nearest 0.1 mg. The extractables, normalized with respect to the original sample weight, is then reported as the weight fraction of n-hexane extractables.

Machine Direction Tear, $MD_{tear}$(gm/mil): ASTM D-1922.

EXAMPLES 1-5 AND 6 (COMPARATIVE)

In Examples 1-5 two polymer components, component 1 and component 2, were dry blended together with antioxidants to inhibit degradation, then passed through a ¾" twin screw Brabender extruder. The extrudate was extruded a second time to ensure intimate mixing and to produce a final polymer in the proportions designated in Table 1. All of the polymers in these Examples were copolymers of ethylene and the comonomer indicated in Table 1. The strength properties, such as MD tear and impact tear resistance, and percent extractables of the resulting blended polymers were then compared to the commercial ethylene/1-hexene copolymer (Exxon 44.87, which is a commercial medium density high molecular weight film resin), and the results are summarized in Table 1 below.

weight end. Examples 1, 3 and 4 are representative of blends with substantially constant melt index-corrected density throughout the molecular weight distribution of the polymer. These examples indicate that the polymers have exceptional strength properties. No known commercial resins having low density and broad molecular weight distribution exist.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A low density ethylene polymer blend having a broad molecular weight distribution, such that its melt flow ratio (MFR) is about 50 to about 250, and a measured density of about 0.910 to about 0.940 g/cc, said blend comprising a linear low density polyethylene first component of high molecular weight (HMW) having a high load melt index ($I_{21}$) of about 0.1 to about 3.0 g/10 min. and a measured density of about 0.880 to 0.920

TABLE 1

PROPERTIES OF LOW DENSITY, BROAD MW DISTRIBUTION POLYETHYLENES BLENDED SAMPLES VERSUS COMMERCIAL, SINGLE COMPONENT RESIN

|  | Example |  |  |  |  | (Comparative) |
|---|---|---|---|---|---|---|
|  | 1 | 2 | 3 | 4 | 5 | 6 |
| Blend of Components | A & b | A & c | B & a | B & b | B & c | Exxon 44.87 |
| Component 1 | A | A | B | B | B | — |
| Comonomer | Butene | Butene | Hexene | Hexene | Hexene | Hexene |
| Density (g/cc) | 0.912 | 0.912 | 0.904 | 0.904 | 0.904 | — |
| Melt Index ($I_{21}$ g/10 min) | 0.39 | 0.39 | 0.38 | 0.38 | 0.38 | — |
| **Corr. Density (g/cc) | 0.937 | 0.937 | 0.929 | 0.929 | 0.929 | — |
| Fraction of Comp. 1 | 0.65 | 0.66 | 0.63 | 0.64 | 0.66 | — |
| Component 2 | b | c | a | b | c | — |
| Comonomer | Butene | Homopmr | Hexene | Butene | Homopmr | — |
| Density (g/cc) | 0.933 | 0.97 | 0.937 | 0.933 | 0.97 | — |
| Melt Index ($I_2$ g/10 min) | 90 | 105 | 76 | 90 | 105 | — |
| *Corr. Density (g/cc) | 0.925 | 0.962 | 0.930 | 0.925 | 0.962 | — |
| Fraction of Comp. 2 | 0.35 | 0.34 | 0.37 | 0.36 | 0.34 | — |
| Final Blend |  |  |  |  |  |  |
| Density (g/cc) | 0.92 | 0.934 | 0.918 | 0.916 | 0.924 | 0.937 |
| $I_{21}$ (g/10 min) | 4.14 | 7.01 | 7.18 | 5.37 | 4.02 | 7.1 |
| MFR | 122 | 125 | 163 | 158 | 139 | 92 |
| MD Tear (gms) | 111 | 64 | 108 | 109 | 90 | 38 |
| Impact (gms) | 1390 | 1280 | ** | ** | 1480 | 260 |
| % Extractables Hexane (%) | 2.63 | 1.03 | 4.77 | 4.52 | 2.77 | 0.62 |

*Designates melt index-corrected density.
**None of the samples ruptured upon impact, value >1400.

The data of Table 1 indicates that the blends of the two components produce polymers which, when manufactured into films, have tear and impact properties better than the single-component Exxon resin of similar density and melt index, e.g., compare the blend of Example 2 to the Comparative Example 6 and the Example 5 blend to the Comparative Example 6.

Examples 2 and 5 represent an illustration of the second embodiment of this invention in which the branches were concentrated on the high molecular g/cc, and a high density polyethylene second component of low molecular weight (LMW) having a melt index ($I_2$) of about 100 to about 1,000 g/10 min. and a measured density of about 0.950 to about 0.970 g/cc, said components having dissimilar melt-index corrected densities.

2. The polymer blend of claim 1 having a MFR of about 70 to about 200 and a measured density of about 0.915 to about 0.940 g/cc, and wherein said first component has a high load melt index ($I_{21}$) of about 0.1 to about 1.0 g/10 min. and a measured density of about 0.890 to about 0.920 g/cc, and said second component has a melt index ($I_2$) of about 100 to about 700 g/10 min.

3. The polymer blend of claim 2 having a MFR of about 80 to about 160 and a measured density of about 0.920 to about 0.940 g/cc, and wherein said first component has a high load melt index ($I_{21}$) of about 0.2 to about 1.0 g/10 min. and a measured density of about 0.900 to about 0.915 g/cc, and said second component has a melt index ($I_2$) of about 200 to about 500 g/10 min. and a measured density of about 0.960 to about 0.970 g/cc.

4. The polymer blend of claim 3 which contains substantially no polymer chains having both, low molecular weight and short chain branches.

5. The polymer blend of claim 4 which contains substantially no polymer chains having both a weight-average molecular weight of about 1,000 to about 10,000 and short chain branches.

6. The polymer blend of claim 1 having a high load melt index ($I_{21}$) of about 3.0 to about 25.0 g/10 min.

7. The polymer blend of claim 6 having a high load melt index ($I_{21}$) of about 5.0 to about 15.0 g/10 min.

8. The polymer blend of claim 7 having a high load melt index ($I_{21}$) of about 6.0 to about 10.0 g/10 min.

9. A method of producing the polymer blend of claim 1 comprising blending said first polymer component with said second polymer component.

* * * * *